(12) United States Patent
Ravuvari et al.

(10) Patent No.: US 11,665,762 B2
(45) Date of Patent: May 30, 2023

(54) INTERFERENCE REDUCTION IN MULTI-SIM CARD (MSIM) WIRELESS COMMUNICATION DEVICES

(71) Applicant: QUALCOMM Incorporated, San Diego, CA (US)

(72) Inventors: AnkammaRao Ravuvari, Hyderabad (IN); Syam Pavan Vadapalli, Visakhapatnam (IN); Roop Sagar Inakollu, Nellore (IN)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/343,599

(22) Filed: Jun. 9, 2021

(65) Prior Publication Data

US 2022/0400528 A1    Dec. 15, 2022

(51) Int. Cl.
| | |
|---|---|
| *H04W 4/00* | (2018.01) |
| *H04W 76/15* | (2018.01) |
| *H04W 36/30* | (2009.01) |
| *H04W 36/08* | (2009.01) |
| *H04W 48/20* | (2009.01) |

(52) U.S. Cl.
CPC ........... *H04W 76/15* (2018.02); *H04W 36/08* (2013.01); *H04W 36/30* (2013.01); *H04W 48/20* (2013.01)

(58) Field of Classification Search
CPC ..... H04W 76/15; H04W 36/08; H04W 36/30; H04W 48/20
See application file for complete search history.

(56) References Cited

U.S. PATENT DOCUMENTS

2015/0296523 A1* 10/2015 Joshi ................... H04W 72/541
                                                            455/553.1
2022/0417990 A1* 12/2022 Chen ....................... H04L 5/001

* cited by examiner

*Primary Examiner* — Justin Y Lee
(74) *Attorney, Agent, or Firm* — Loza & Loza, LLP

(57) ABSTRACT

Aspects relate to reducing interference in multi-subscriber identity module card (MSIM) wireless communication devices. The wireless communication device may select a first cell for communication in a first frequency band of a first frequency range utilizing a first SIM card. The wireless communication device may further identify a cell subset of set of cells operating in respective second frequency bands of a second frequency range that each minimize interference with the first frequency band. The wireless communication device may then select a second cell of the cell subset for communication utilizing a second SIM card.

30 Claims, 12 Drawing Sheets

INTERFERENCE REDUCTION IN MULTI-SIM CARD (MSIM) WIRELESS COMMUNICATION DEVICES

TECHNICAL FIELD

The technology discussed below relates generally to wireless communication systems, and more particularly, to reducing interference between subscriber identification module (SIM) cards in multi-SIM card (MSIM) wireless communication devices.

INTRODUCTION

Fifth Generation (5G) New Radio (NR) networks may deploy cells that utilize either a millimeter wave (e.g., FR2) carrier or a sub-6 GHz (e.g., FR1) carrier to facilitate communication between a base station and a user equipment (UE). In some wireless communication networks, a UE may be configured to simultaneously communicate on multiple carriers. For example, a UE may include two or more subscriber identity module (SIM) cards, each providing a different service by a different mobile operator. One SIM card may be associated with a dedicated data subscription (DDS) that may be used by the UE for data services, while another SIM card may be associated with a non-DDS (n-DDS) that may be used by the UE for voice calls.

In such multi-SIM card (MSIM) devices, each SIM card may operate in a respective radio access technology (RAT) and may be configured for use in a respective frequency range. For example, one of the SIM cards may be configured for operation in a NR RAT, while the other SIM card may be configured for operation in a legacy RAT. The legacy RAT may be, for example, Fourth Generation (4G) Long Term Evolution (LTE), Third Generation (3G) Universal Mobile Telecommunications Systems (UMTS) wideband code division multiple access (WCDMA), code division multiple access (CDMA), Global System for Mobile Communication (GSM), or other suitable legacy RAT. Other MSIM device configurations may include two SIM cards operating in the same RAT (e.g., both LTE or both NR).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) in a wireless communication network is disclosed. The UE includes a transceiver, a memory, and a processor coupled to the transceiver and the memory. The processor and the memory can be configured to select a first cell for communication in a first frequency band of a first frequency range, identify a set of cells operating in a second frequency range within a geographical area of the UE, identify a cell subset of the set of cells operating in respective second frequency bands of the second frequency range that each minimize interference with the first frequency band, and select a second cell of the cell subset for simultaneous communication in the respective second frequency band via the second cell and the first frequency band via the first cell.

Another example provides a method of wireless communication at a wireless communication device in a wireless communication network. The method includes selecting a first cell for communication in a first frequency band of a first frequency range, identifying a set of cells operating in a second frequency range within a geographical area of the wireless communication device, identifying a cell subset of the set of cells operating in respective second frequency bands of the second frequency range that each minimize interference with the first frequency band, and selecting a second cell of the cell subset for simultaneous communication in the respective second frequency band via the second cell and the first frequency band via the first cell.

Another example provides an apparatus configured for wireless communication. The apparatus includes means for selecting a first cell for communication in a first frequency band of a first frequency range, means for identifying a set of cells operating in a second frequency range within a geographical area of the wireless communication device, means for identifying a cell subset of the set of cells operating in respective second frequency bands of the second frequency range that each minimize interference with the first frequency band, and means for selecting a second cell of the cell subset for simultaneous communication in the respective second frequency band via the second cell and the first frequency band via the first cell.

Another example provides a non-transitory computer-readable medium having instructions stored therein for causing one or more processors of a wireless communication device in a wireless communication network to select a first cell for communication in a first frequency band of a first frequency range, identify a set of cells operating in a second frequency range within a geographical area of the UE, identify a cell subset of the set of cells operating in respective second frequency bands of the second frequency range that each minimize interference with the first frequency band, and select a second cell of the cell subset for simultaneous communication in the respective second frequency band via the second cell and the first frequency band via the first cell.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

Figure 1:
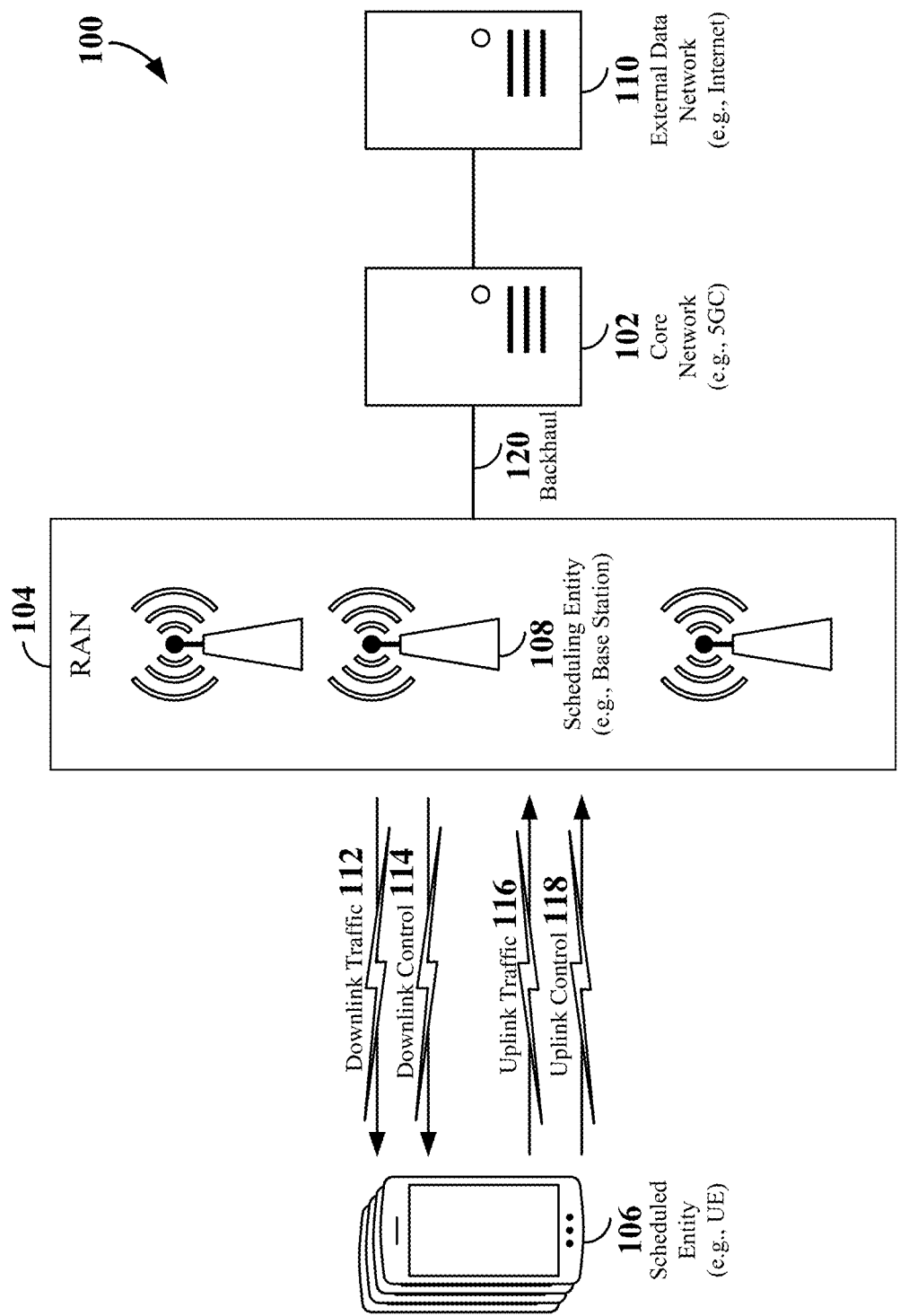
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects relate to reducing interference in multi-subscriber identity module card (MSIM) wireless communication devices (e.g., UEs). A MSIM wireless communication device may select a first cell for communication in a first frequency band of a first frequency range. The first cell may be utilized for communication by a first SIM card of the wireless communication device. In some examples, the first SIM card may be a DDS SIM card operating in a NR radio access technology (RAT). The wireless communication device may further identify a cell subset of a set of cells operating in respective second frequency bands of a second frequency range that each minimize (or avoid) interference with the first frequency band. The wireless communication device may then select a second cell of the cell subset for communication thereon. The second cell may be utilized for communication by a second SIM card of the wireless communication device. In some examples, the second SIM card may be a n-DDS SIM card operating in an LTE RAT.

Aspects are further applicable to other combinations of interfering frequency bands in the same or different RATs.

In some examples, the wireless communication device may select the second cell during cell acquisition (e.g., when both SIM cards are in an RRC idle state) or while the DDS SIM is an RRC connected state and either a handover of the DDS SIM or cell reselection of the n-DDS SIM is performed, resulting in interference between the frequency bands utilized by the DDS SIM and the n-DDS SIM.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
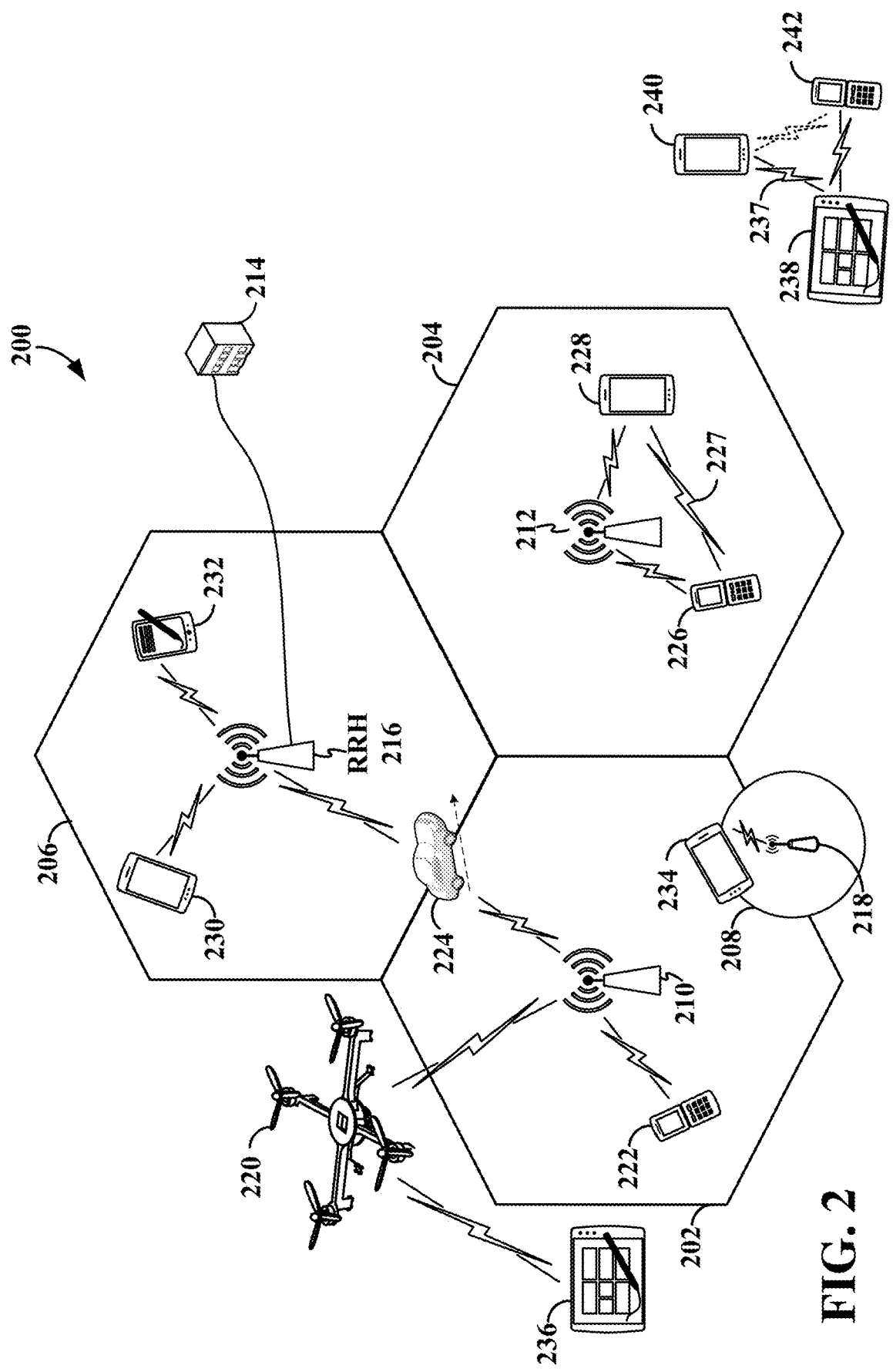
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242)

may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
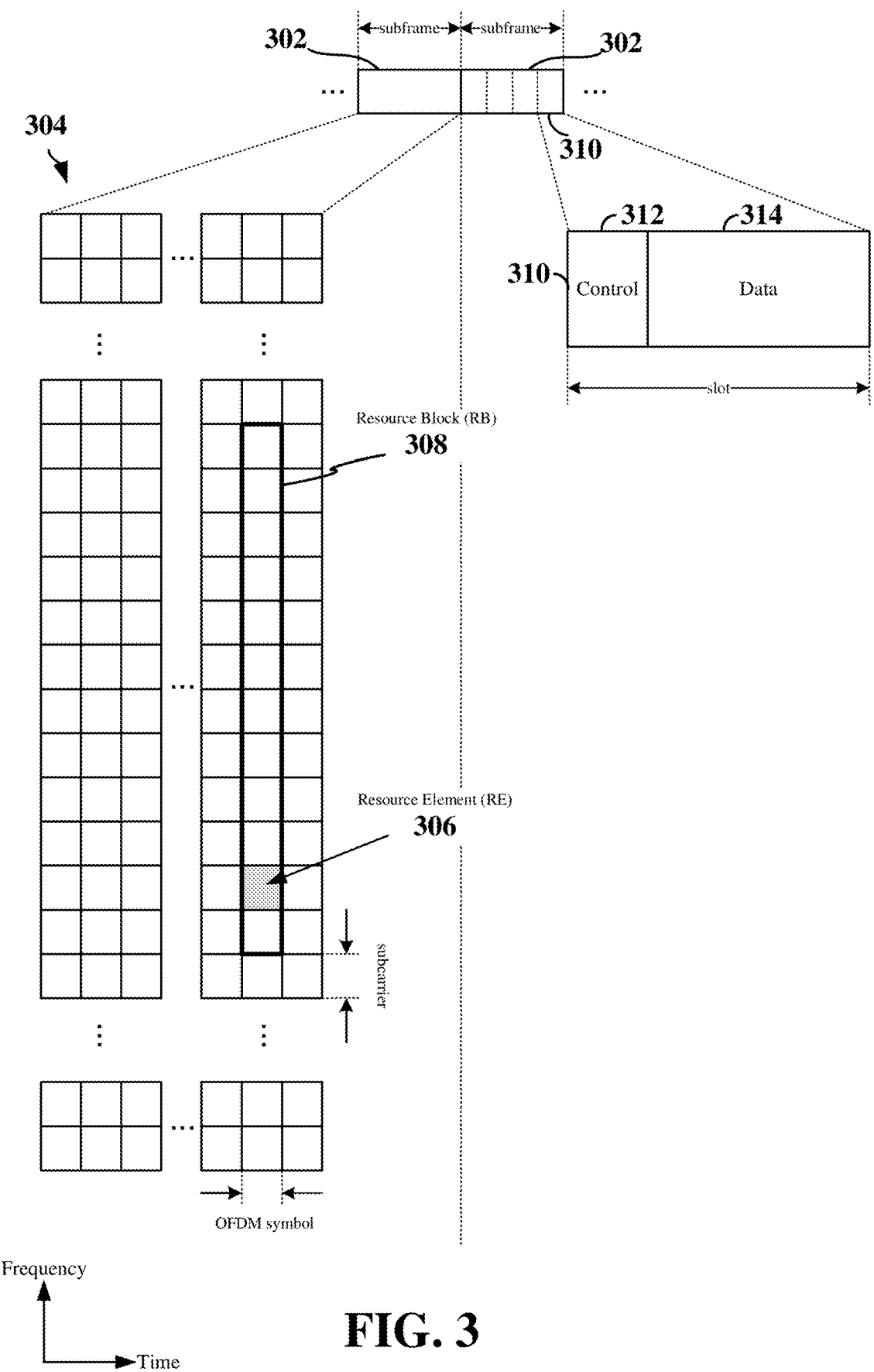
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH)

within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Wireless communication networks, such as 4G LTE and/or 5G NR networks, may further support carrier aggregation in a multi-cell transmission environment where, for example, different base stations and/or different transmission and reception points (TRPs) may communicate on different component carriers within overlapping cells. In some aspects, the term component carrier may refer to a carrier frequency (or band) utilized for communication within a cell.

Figure 4:
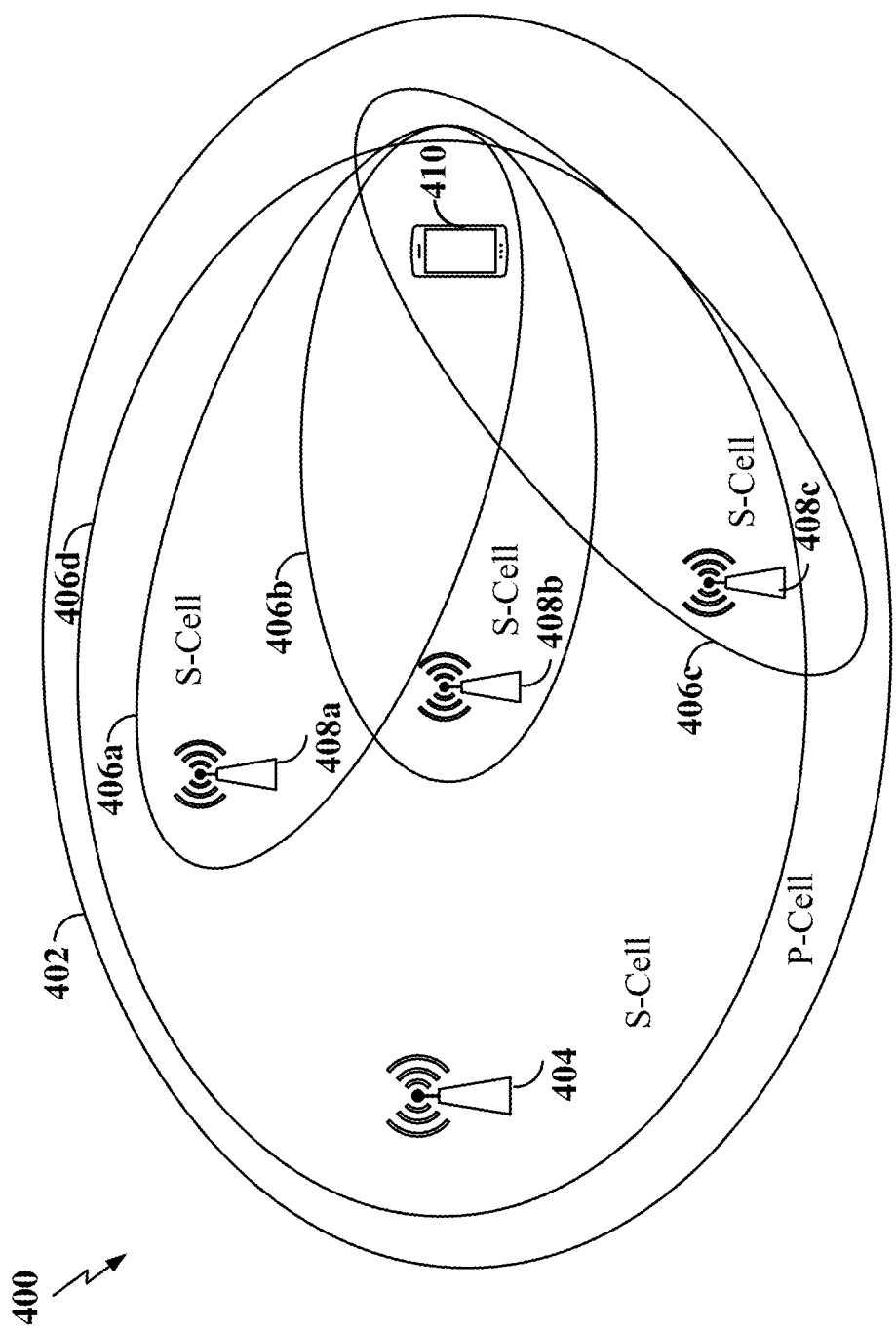
FIG. 4 is a diagram illustrating a multi-cell transmission environment according to some aspects.

FIG. 4 is a diagram illustrating a multi-cell transmission environment 400 according to some aspects. The multi-cell transmission environment 400 includes a primary serving cell (PCell) 402 and one or more secondary serving cells (SCells) 406a, 406b, 406c, and 406d. The PCell 402 may be referred to as the anchor cell that provides a radio resource control (RRC) connection to a UE (e.g., UE 410).

When carrier aggregation is configured in the multi-cell transmission environment 400, one or more of the SCells 406a-406d may be activated or added to the PCell 402 to form the serving cells serving the UE 410. In this case, each of the serving cells corresponds to a component carrier (CC). The CC of the PCell 402 may be referred to as a primary CC, and the CC of a SCell 406a-406d may be referred to as a secondary CC.

Each of the PCell 402 and the SCells 406a-406d may be served by a transmission and reception point (TRP). For example, the PCell 402 may be served by TRP 404 and each of the SCells 406a-406c may be served by a respective TRP 408a-408c. Each TRP 404 and 408a-408c may be a base station (e.g., gNB), remote radio head (RRH) of a gNB, or other scheduling entity similar to those illustrated in any of FIG. 1 or 2. In some examples, the PCell 402 and one or more of the SCells (e.g., SCell 406d) may be co-located. For example, a TRP for the PCell 402 and a TRP for the SCell 406d may be installed at the same geographic location. Thus, in some examples, a TRP (e.g., TRP 404) may include multiple TRPs, each corresponding to one of a plurality of co-located antenna arrays, and each supporting a different carrier (different CC). However, the coverage of the PCell 402 and SCell 406d may differ since component carriers in different frequency bands may experience different path loss, and thus provide different coverage.

The PCell 402 is responsible not only for connection setup, but also for radio resource management (RRM) and radio link monitoring (RLM) of the connection with the UE 410. For example, the PCell 402 may activate one or more of the SCells (e.g., SCell 406a) for multi-cell communication with the UE 410 to improve the reliability of the connection to the UE 410 and/or to increase the data rate. In some examples, the PCell may activate the SCell 406a on an as-needed basis instead of maintaining the SCell activation when the SCell 406a is not utilized for data transmission/reception in order to reduce power consumption by the UE 410.

In some examples, the PCell 402 may be a low band cell, and the SCells 406 may be high band cells. A low band (LB) cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

In some examples, the PCell 402 may utilize a first radio access technology (RAT), such as LTE, while one or more of the SCells 406 may utilize a second RAT, such as 5G-NR. In this example, the multi-cell transmission environment may be referred to as a multi-RAT-dual connectivity (MR-DC) environment. One example of MR-DC is an Evolved-Universal Terrestrial Radio Access Network-New Radio dual connectivity (EN-DC) mode that enables a UE to simultaneously connect to an LTE TRP and a NR TRP to receive data packets from and send data packets to both the LTE TRP and the NR TRP.

Figure 5:
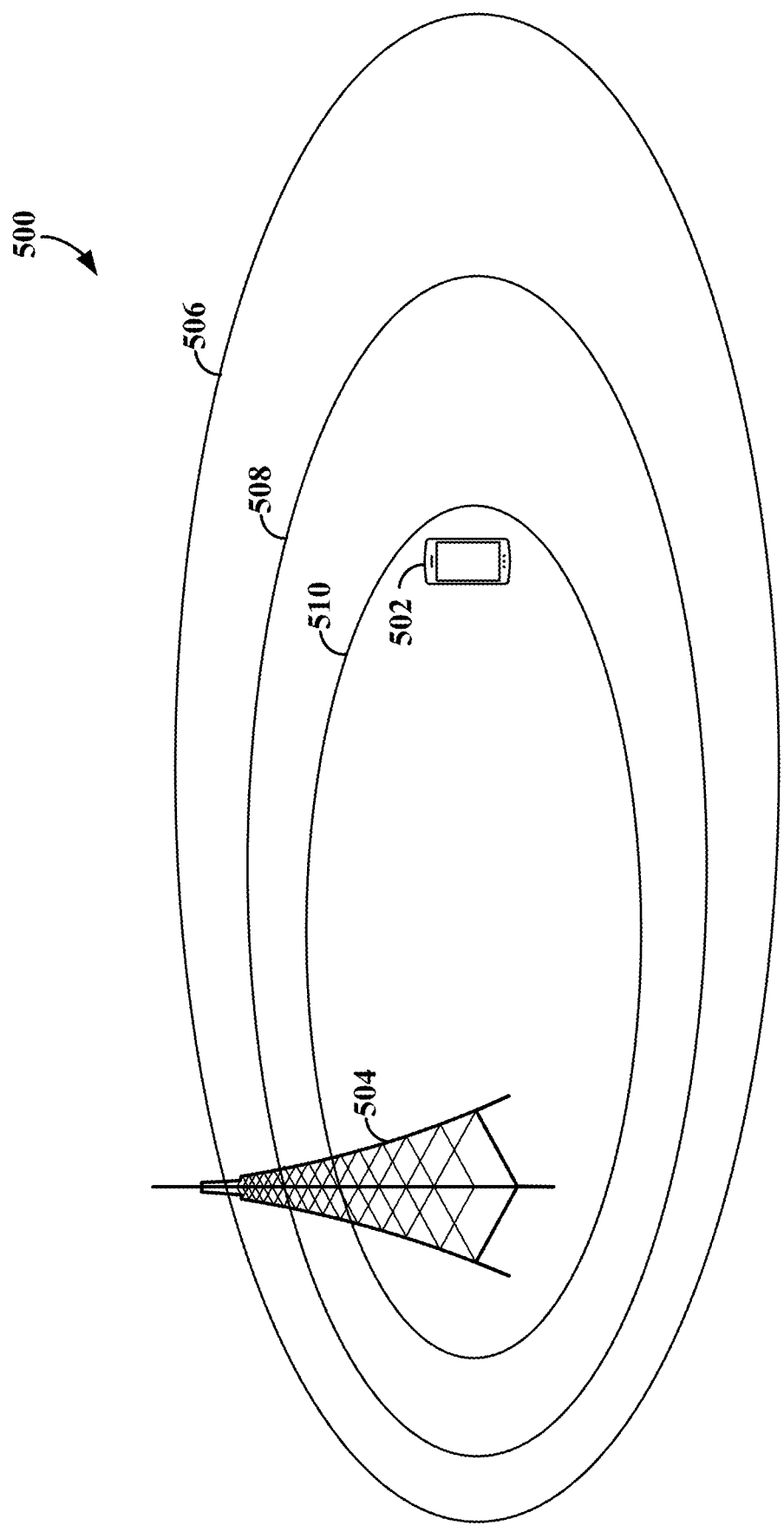
FIG. 5 is a diagram illustrating a multi-RAT deployment environment according to some aspects.

FIG. 5 is a diagram illustrating a multi-RAT deployment environment 500 according to some aspects. In the multi-RAT deployment environment 500 shown in FIG. 5, a UE 502 may communicate with a base station 504 using one or more of a plurality of RATs. For example, the base station 504 may include a plurality of co-located TRPs, each serving a respective cell 506, 508, and 510. Each cell 506, 508, and 510 may communicate using a respective RAT and corresponding frequency range. In some examples, the RATs may include LTE and NR. For example, a first cell 506 may be an LTE cell that operates in an LTE frequency range to provide wide area coverage to the UE 502. For example, the LTE frequency range may include the E-UTRA frequency bands between 450 MHz and 3.8 GHz. In addition, a second cell 508 may be a NR cell that operates in a sub-6 GHz frequency range (e.g., FR1), and a third cell 510 may be a NR cell that operates in a mmWave frequency range (e.g., FR2 or higher).

In some examples, the UE 502 may communicate with the base station 504 over two or more of the cells 506, 508, and 510 in a MR-DC mode, such as EN-DC, as described above. In other examples, the UE 502 may be a multi-SIM card (MSIM) UE that includes two or more SIM cards, each associated with a respective subscription and respective phone number. For example, the UE 502 may include a first SIM card having a dedicated data subscription (DDS) that may be used by the UE 502 for data services, and a second SIM card having a non-DDS (n-DDS) that may be used by the UE 502 for voice calls. In some examples, each SIM card may communicate in a respective RAT. For example, the DDS SIM card may utilize a NR RAT to communicate on cell 508 or 510, and the n-DDS SIM card may utilize an LTE RAT to communicate on cell 506.

Figure 6:
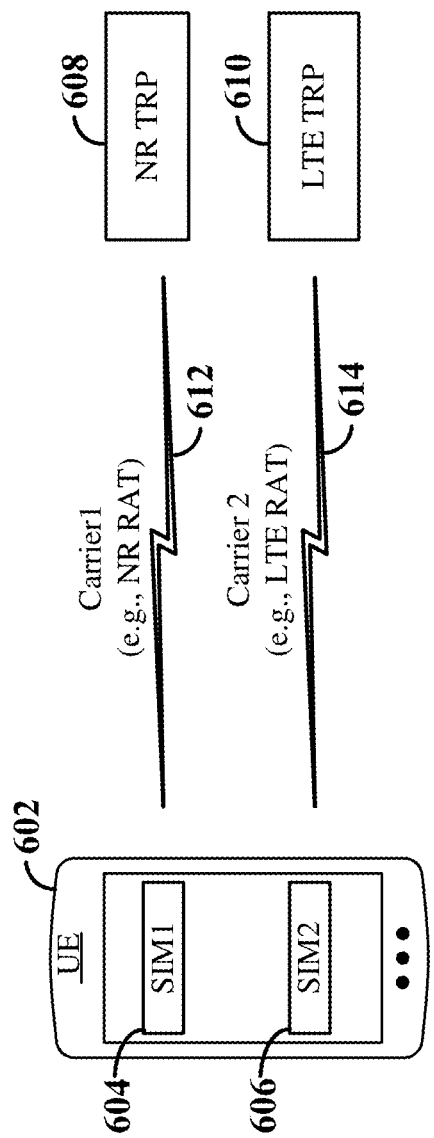
FIG. 6 is a diagram illustrating a multi-subscriber identity module card (MSIM) wireless communication device according to some aspects.

FIG. 6 is a diagram illustrating a multi-subscriber identity module card (MSIM) wireless communication device according to some aspects. In the example shown in FIG. 6, the wireless communication device (UE 602) includes two SIM cards (SIM1 604 and SIM2 606). Each SIM card 604 and 606 is configured for communication in a different RAT. For example, SIM1 604 is configured for communication utilizing a NR RAT and SIM2 606 is configured for communication utilizing an LTE RAT. Thus, SIM1 604 may communicate signals 612 with a NR TRP 608 over a first carrier frequency in a first frequency band of a NR frequency range (e.g., FR1 or FR2) and SIM2 606 may communicate signals 614 with an LTE TRP 610 over a second carrier frequency in a second frequency band of an LTE frequency range.

For example, SIM1 604 may have a DDS for communication of data 612 (e.g., e-mail, Internet, etc.) with the NR TRP 608 and SIM2 606 may have a n-DDS for communication of voice signals 614 with the LTE TRP 610. In this example, SIM1 604 may be in a radio resource control (RRC) connected mode, while SIM2 606 may be in an RRC idle mode until a voice call is made or received by the UE 602. This configuration of SIM cards 604 and 606 may be referred to as a dual SIM dual standby mode in which the UE 602 includes a single transceiver for both SIM cards 604 and 606 and both SIM cards 604 and 606 are active, but only one SIM card 604 or 606 may use the transceiver for same direction communications at a time. For example, SIM1 604 may be in an RRC connected mode to send/receive data to/from the NR network, while SIM2 606 may be in an RRC idle mode. SIM2 606 may periodically access the transceiver and utilize a receive chain (e.g., RF/baseband processor) in the UE 602 to receive and decode any paging messages from the LTE network. Thus, SIM2 606 may periodically interrupt receive operations (e.g., downlink operations) of the SIM1 604 to receive and decode a page. During a paging time window of SIM2 606 within which SIM2 606 may receive the page, SIM1 604 may continue to use the transceiver for transmit operations (e.g., uplink operations). In other examples, SIM1 604 may have the n-DDS, while SIM2 has the DDS.

In such MSIM wireless communication devices, the operating frequency band utilized by one of the SIM cards may be harmonious to the operating frequency band utilized by the other SIM card. For example, the second harmonic of the carrier frequency on which SIM1 604 is communicating may interfere with the center frequency (e.g., carrier frequency) on which SIM2 606 is communicating, resulting in desense in the receiver of SIM2 606. Desense may refer to the degradation in sensitivity at the receiver due to noise produced as a result of interfering transmissions by the transmitter. For example, desense may occur when SIM1 604 is communicating on a frequency band in FR1 that interferes with an LTE frequency band on which SIM2 606 is communicating. This may result in missed pages on SIM2 606.

Other interfering frequency band combinations may also occur between other MSIM configurations. For example, interfering frequency band combinations may occur when both SIM1 604 and SIM2 606 operate on a NR RAT or an LTE RAT, when SIM1 604 operates on an LTE RAT, while SIM2 606 operates on a NR RAT, or when SIM1 604 operates on a NR or LTE RAT, while SIM2 606 operates on a Third Generation (3G) Universal Mobile Telecommunications Systems (UMTS) wideband code division multiple access (WCDMA) RAT (or vice-versa), a code division multiple access (CDMA) RAT, a Global System for Mobile Communication (GSM) RAT, or other suitable legacy RAT. In an example of SIM1 604 and SIM2 606 both operating on a NR RAT, SIM1 604 may implement time division duplex (TDD), while SIM2 606 may implement frequency division duplex (FDD) within FR1.

Various desense mitigation mechanisms may be implemented on the UE 602 to isolate transmissions on SIM1 604 from receptions on SIM2 606. For example, the UE 602 may decrease the uplink transmit power on SIM1 604 during the paging time window of SIM2 606. However, these desense mitigation mechanisms may degrade the uplink transmission performance in terms of the block error ratio (BLER), which may put additional load on both the UE 602 and the network (e.g., NR TRP 608).

Therefore, various aspects of the disclosure relate to selection of cells for MSIM UEs that mitigate desense between frequency bands utilized in each of the cells. For example, the UE 602 may mitigate desense by selecting a cell for the n-DDS SIM that reduces or avoids interference with the frequency band utilized by the DDS SIM. The UE 602 may perform the cell selection during cell acquisition (e.g., when the DDS SIM and n-DDS SIM are in an RRC idle state) or while the DDS SIM is an RRC connected state and either a handover of the DDS SIM or cell reselection of the n-DDS SIM is performed.

Figure 7:
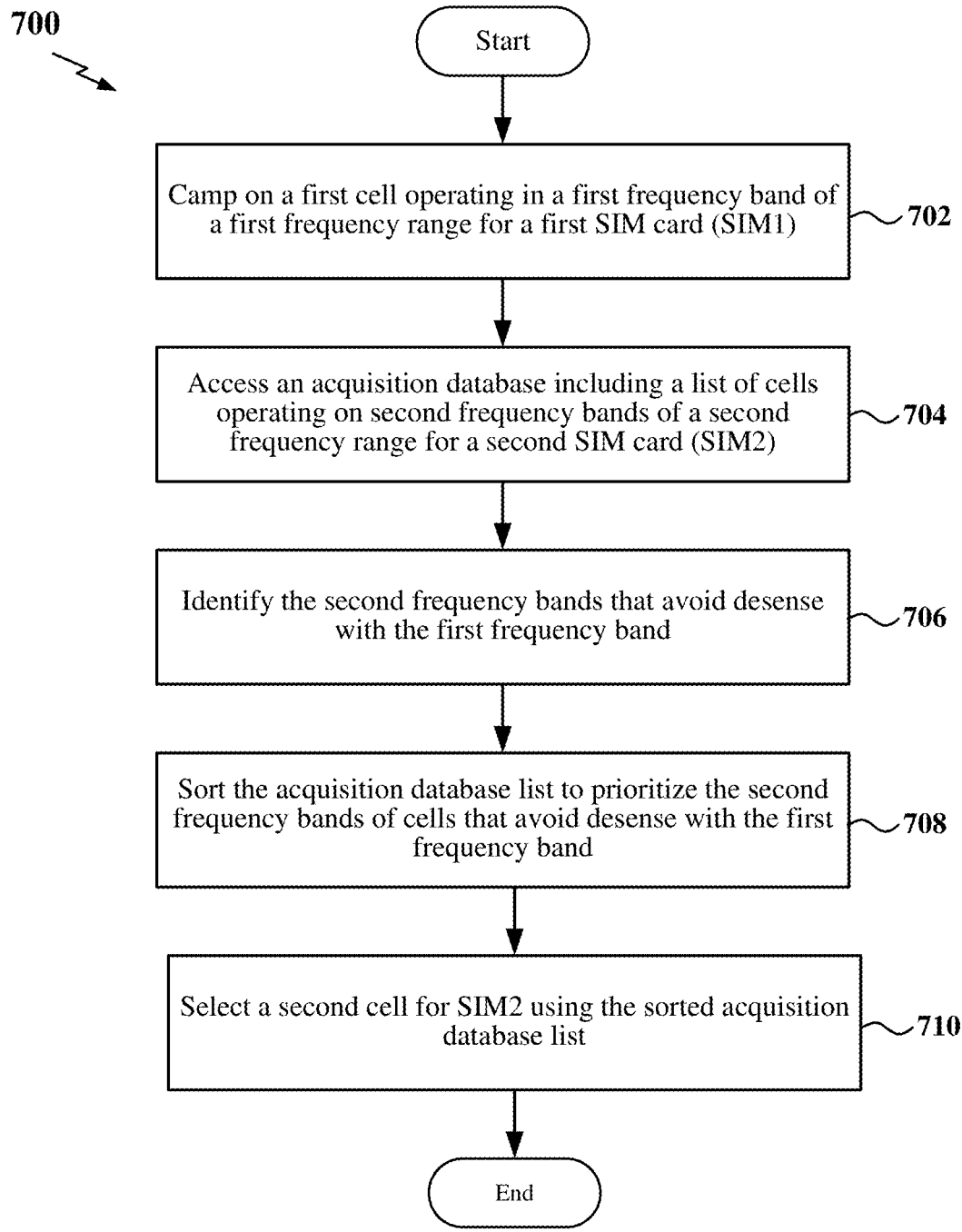
FIG. 7 is a flow chart illustrating an exemplary process for cell acquisition with reduced interference on MSIM wireless communication devices according to some aspects.

FIG. 7 is a flow chart illustrating an exemplary process 700 for cell acquisition with reduced interference on MSIM wireless communication devices according to some aspects. As described below, some or all illustrated features may be omitted in a particular implementation within the scope of the present disclosure, and some illustrated features may not be required for implementation of all examples. In some examples, the process 700 may be carried out by the UE 1100 illustrated in FIG. 11. In some examples, the process 700 may be carried out by any suitable apparatus or means for carrying out the functions or algorithm described below.

At block 702, the UE may camp on a first cell operating in a first frequency band of a first frequency range for a first SIM card (SIM1) of the UE. The SIM1 may, for example, be a DDS SIM. The first frequency band may be within a first frequency range associated with a first RAT. For example, the first frequency range may be FR1 associated with a NR RAT. The UE may camp on the first cell in an RRC idle mode of SIM1 during initial cell acquisition or upon exiting from an out-of-service state (e.g., upon powering on or re-entering a coverage area of the wireless communication network associated with SIM1).

At block 704, the UE may access an acquisition database including a list of a set of cells operating on respective second frequency bands of a second frequency range for a second SIM card (SIM2). The SIM2 may, for example, be a n-DDS SIM. The second frequency range may be associated with a second RAT. For example, the second RAT may be LTE. Although the example described in FIG. 7 considers a NR DDS SIM and an LTE n-DDS SIM, the process described in FIG. 7 may be applicable to any other combination of interfering frequency bands. For example, SIM1 and SIM2 may both operate on a NR RAT or an LTE RAT, SIM1 may operate on an LTE RAT, while SIM2 operates on a NR RAT, or SIM1 may operate on a NR or LTE RAT, while SIM2 operates on a WCDMA RAT, a CDMA RAT, a GSM RAT, or other suitable legacy RAT. Other combinations of potential interfering RATs may further be possible in various aspects of the disclosure.

The acquisition database may be populated with previous camped cells (e.g., previously camped second frequency bands) of the SIM2. The last camped frequency (last camped cell) may have the highest priority in the acquisition database, and therefore, be listed first in the acquisition database list. In some examples, each entry in the acquisition database list may include an absolute radio frequency channel number (ARFCN) indicating the frequency band and channel number of a carrier frequency utilized in a previously camped cell. In some examples, the list of previously camped cells in the acquisition database may be populated as a result of a high-density LTE deployment, such as an LTE carrier aggregation deployment, in which a plurality of overlapping LTE cells, each communicating on a different component carrier, are deployed in a geographical area.

At block 706, the UE may identify the second frequency bands in the acquisition database that avoid desense with the first frequency band. For example, based on the ARFCN of the carrier frequency (e.g., a first ARFCN of a first carrier frequency) in the first frequency band that the UE is camped onto in the first cell, the UE may identify a location of the second harmonic of the first carrier frequency. The UE may then identify the second frequency bands (e.g., second ARFCNs of second carrier frequencies) in the acquisition database that do not interfere with (or otherwise result in a reduced interference with) the second harmonic of the first carrier frequency.

At block 708, the UE may sort the acquisition database list to prioritize the previously camped cells operating on second frequency bands that avoid desense with the first frequency band. For example, the UE may include each of the cells operating on second frequency bands that avoid desense (e.g., the second frequency bands that minimize interference with the first frequency band) prior to any remaining cells operating on second frequency bands that may result in desense (e.g., the second frequency bands that may interfere with the second harmonic of the first carrier frequency of the first frequency band). In some examples, the UE may include the last camped cell first in the list regardless of whether the second frequency band of the last camped cell results in desense.

At block 710, the UE may select a second cell for SIM2 using the sorted acquisition database list. For example, the UE may perform a cell acquisition search to select the second cell for the SIM2 based on the sorted acquisition database list and then camp on the selected second cell. In some examples, the second cell may operate using a second frequency band in the acquisition database list that avoids interference with the first frequency band. For example, the second cell may be the first-listed cell in the acquisition database list that operates on a non-interfering second frequency band and meets the requirements for camping.

Figure 8:
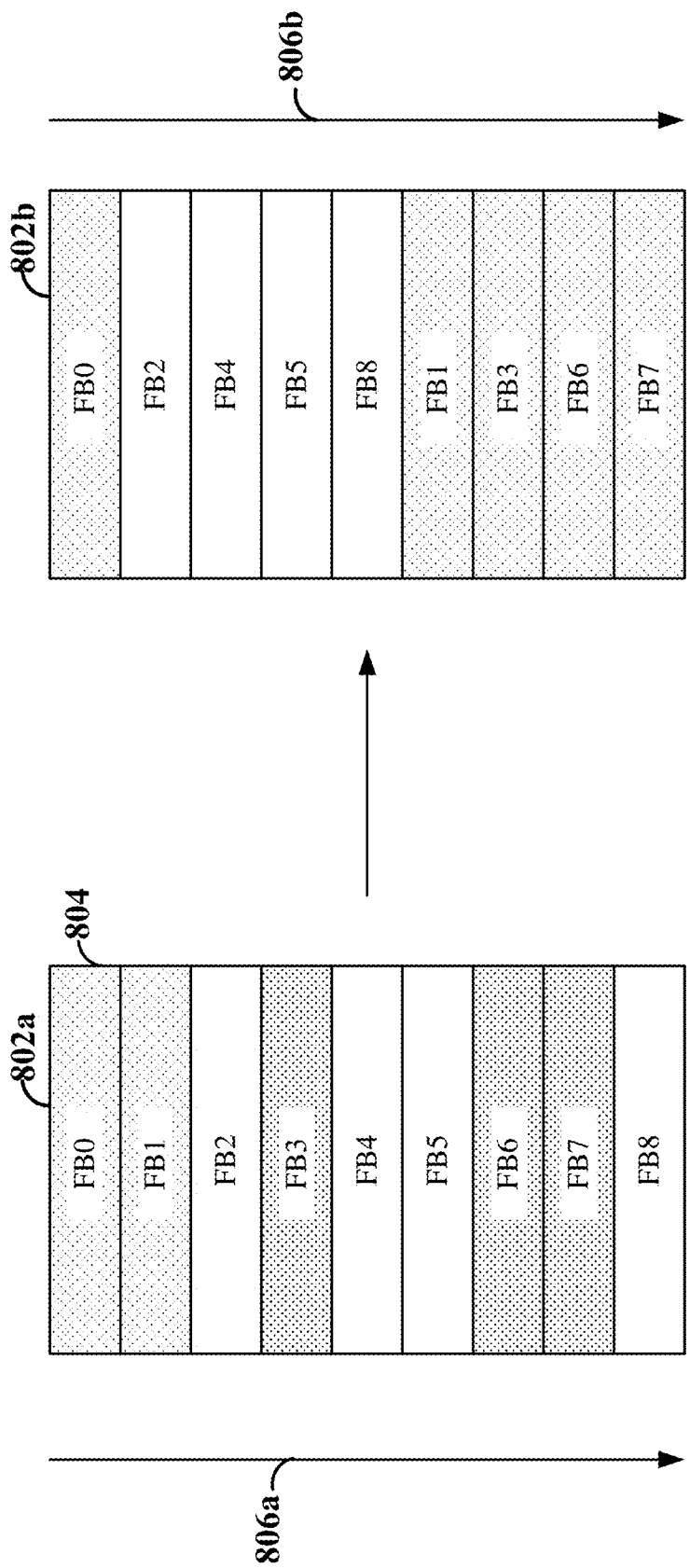
FIG. 8 is a diagram illustrating exemplary acquisition database sorting for a MSIM wireless communication device according to some aspects.

FIG. 8 is a diagram illustrating exemplary acquisition database sorting for a MSIM wireless communication device according to some aspects. In the example shown in FIG. 8, an original acquisition database 802a is illustrated including a plurality of previously camped cells, each associated with a respective frequency band 804 (FB0 . . . FB8) of a particular frequency range associated with a SIM card of a UE. The original acquisition database 802a includes an original (first) list 806a of the cells/frequency bands 804 in a first order. One or more of the frequency bands 804 (e.g., FB2, FB4, FB5, and FB8) may avoid interference with (e.g., not cause desense on) another frequency band utilized by another SIM card of the UE. The remaining frequency bands (e.g., FB1, FB3, FB6, and FB7) may interfere with the other frequency band utilized by the other SIM card. A first camped frequency band (FB0) associated with a first camped cell in the first list 806a may be the last camped cell/frequency band of the SIM card. In the example shown in FIG. 8, FB0 may interfere with the other frequency band utilized by the other SIM card. However, in other examples, FB0 may not interfere with the other frequency band utilized by the other SIM card.

In some aspects, the UE may sort the original acquisition database 802a to produce a sorted acquisition database 802b including a sorted (second) list 806b of the plurality of cells/frequency bands 804 in a second order. The sorted acquisition database 802b may maintain the cell operating on FB0 as the first cell/frequency band in the list 806b and may then re-order the cells/frequency bands 804 in the list 806b to prioritize the cells associated with frequency bands (e.g., FB2, FB4, FB5, and FB8) that avoid interference with (or otherwise reduce interference with) the other frequency band utilized by the other SIM card. For example, the second list 806b may include the following second order of cells/frequency bands: FB0, FB2, FB4, FB5, FB8, FB1, FB3, FB6, and FB7.

The UE may utilize the second list 806b in the sorted acquisition database 802b to select a cell for the SIM card to camp onto. For example, the UE may determine that FB0 interferes with the other frequency band of the other SIM card, so the UE may not select the last camped cell operating in FB0. The UE may then select a next cell operating on a non-interfering FB in the second list 806b that meets camping requirements. For example, if the cell operating on FB2 meets the camping requirements, the UE may select that cell to camp onto for the SIM card.

Figure 9:
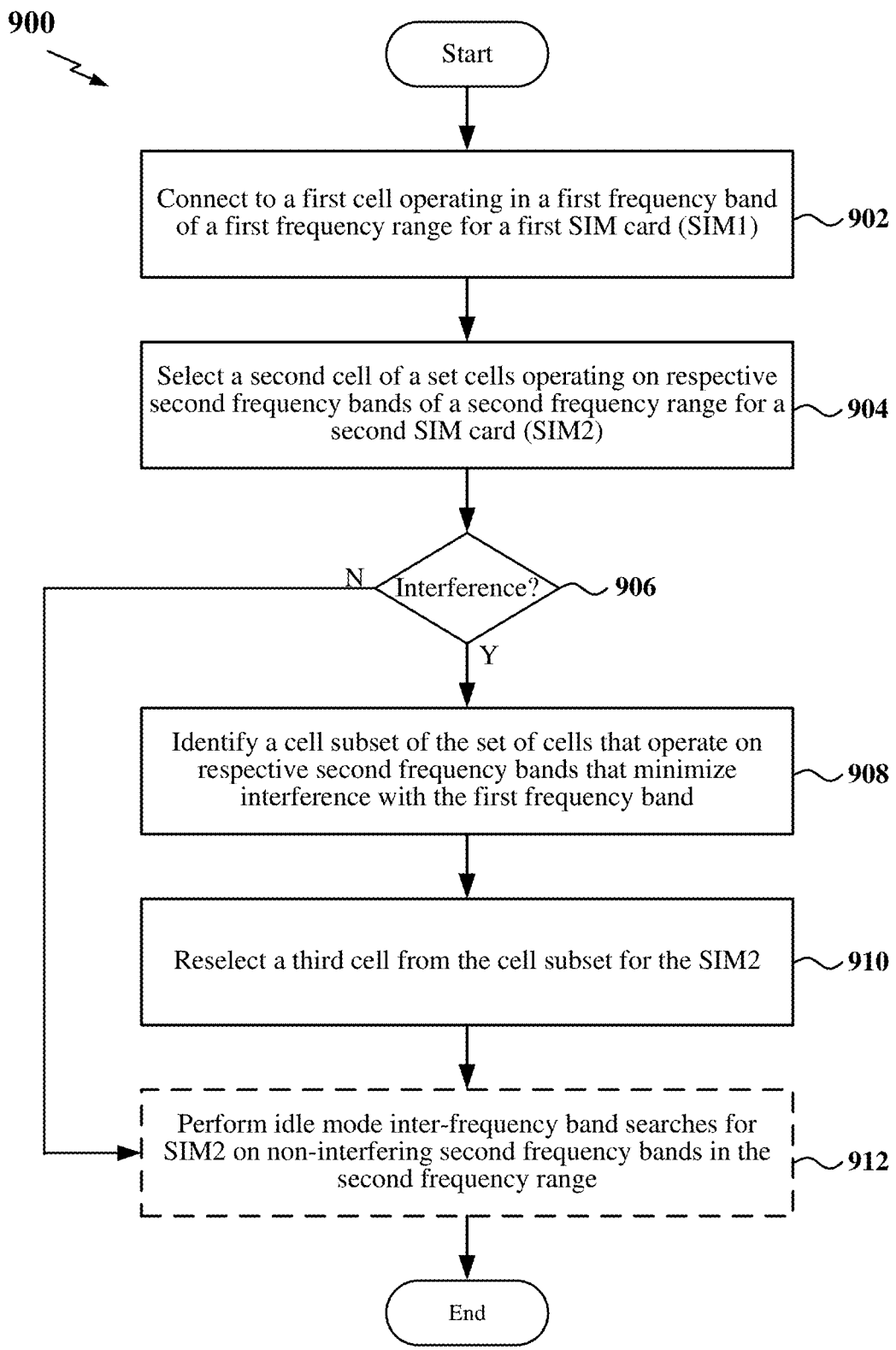
FIG. 9 is a flow chart illustrating an exemplary process for cell reselection with reduced interference on MSIM wireless communication devices according to some aspects.

FIG. 9 is a flow chart illustrating an exemplary process 900 for cell reselection with reduced interference on MSIM wireless communication devices according to some aspects. As described below, some or all illustrated features may be omitted in a particular implementation within the scope of the present disclosure, and some illustrated features may not be required for implementation of all examples. In some examples, the process 900 may be carried out by the UE 1100 illustrated in FIG. 11. In some examples, the process 900 may be carried out by any suitable apparatus or means for carrying out the functions or algorithm described below.

At block 902, the UE may connect to a first cell operating in a first frequency band of a first frequency range for a first SIM card (SIM1). The SIM1 may, for example, be a DDS SIM. The first frequency range may be associated with a first RAT. For example, the first frequency range may be FR1 associated with a NR RAT. At block 904, the UE may further select a second cell of a set of cells operating on respective second frequency bands of a second frequency range for a second SIM card (SIM2). The SIM2 may, for example, be a n-DDS SIM. The second frequency range may be associated with a second RAT. For example, the second RAT may be LTE. Although the example described in FIG. 9 considers a NR DDS SIM and an LTE n-DDS SIM, the process described in FIG. 9 may be applicable to any other combination of interfering frequency bands. The UE may connect to the first cell in an RRC connected mode of SIM1 and may select the second cell in an RRC idle mode of SIM2.

At 906, the UE may determine whether the second frequency band of the second cell interferes with the first frequency band of the first cell. For example, the UE may determine whether there is interference between the first frequency band and the second frequency band after performing a handover to the first cell or upon performing a cell selection or reselection to the second cell. Based on the ARFCN of the carrier frequency (e.g., a first ARFCN of a first carrier frequency) in the first frequency band in the first cell, the UE may identify a location of the second harmonic of the first carrier frequency. The UE may then determine whether a second ARFCN of a second carrier frequency in the second frequency band of the second cell interferes with the second harmonic of the first carrier frequency. If there is interference between the first frequency band in the first cell and the second frequency band in the second cell, the UE may experience desense on SIM2.

Therefore, in response to detecting interference between the first cell and the second cell (Y branch of block 906), at block 908, the UE may identify a cell subset of the set of cells that operate on respective second frequency bands that minimize interference with the first frequency band. For example, the UE may identify the second frequency bands (e.g., second ARFCNs of second carrier frequencies) of the set of cells that do not interfere with (or otherwise result in a reduced interference with) the second harmonic of the first carrier frequency in the first frequency band. The UE may then include each cell having a second frequency band that does interfere with the first frequency band in the cell subset.

At block 910, the UE may then reselect to a third cell from the cell subset for the SIM2. For example, the UE may perform a cell reselection procedure to reselect the third cell. Cell reselection may involve, for example, the UE scanning transmissions (e.g., SSB transmissions) in the respective second frequency band of each cell in the cell subset to measure the corresponding signal strength of each of the cells. The UE may then select a suitable cell in the cell subset on which the UE can camp on based on the cell measurements and various other cell selection criteria. In examples in which SIM2 is a NR n-DDS SIM and the second cell operates on an FR1 frequency band, the third cell may operate on a different FR1 frequency band or an FR2 frequency band, if available.

If there is no interference between the first cell and the second cell (N branch of block 906), or once the UE reselects the third cell, at block 912, the UE may further optionally perform idle mode inter-frequency band searches for SIM2 on non-interfering second frequency bands in the second frequency range. In some examples, the UE may limit the idle mode searches to the non-interfering second frequency bands to reduce the cell measurement and search complexity, which may reduce power consumption and processing time.

Figure 10:
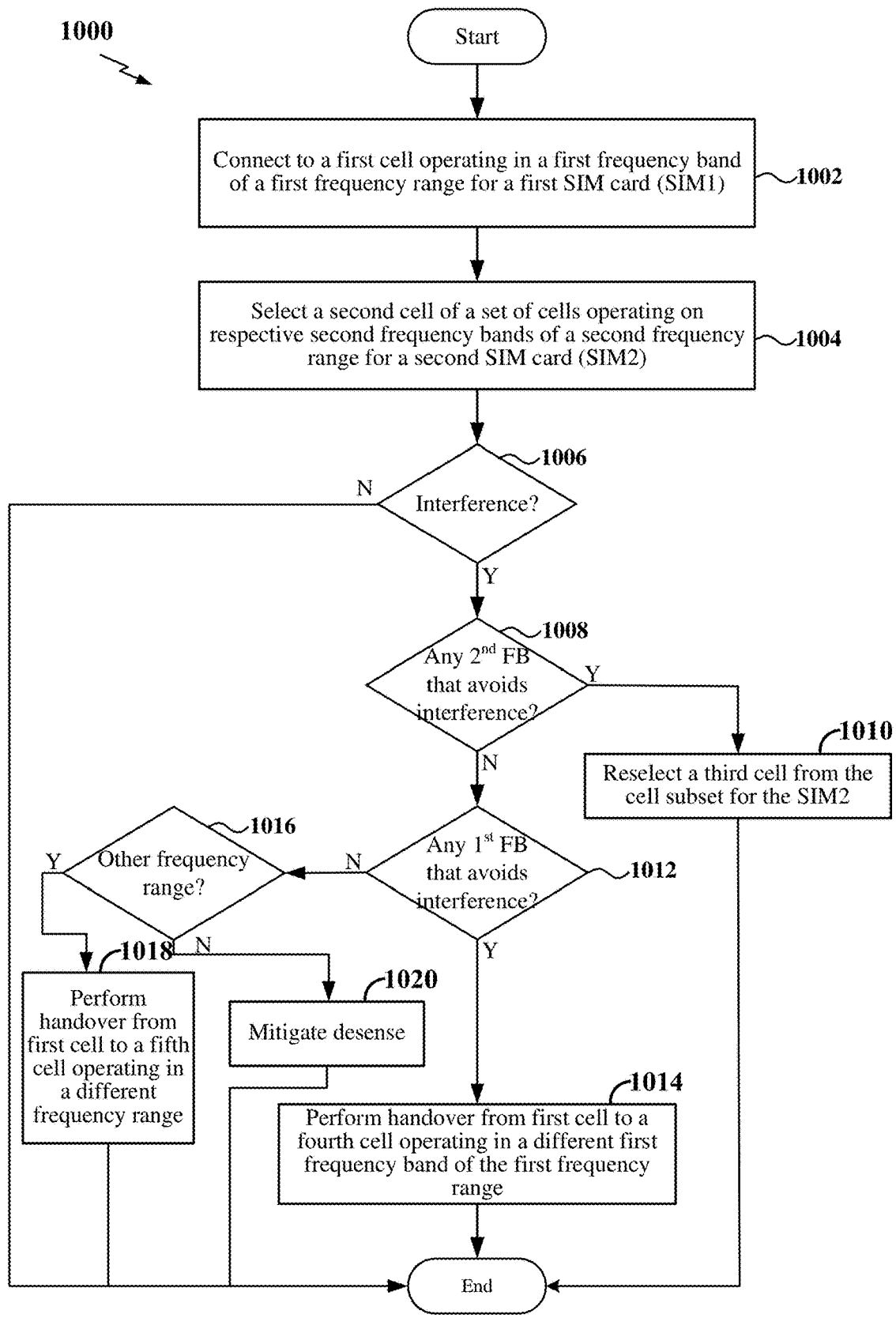
FIG. 10 is a flow chart illustrating an exemplary process for performing a handover with reduced interference on MSIM wireless communication devices according to some aspects.

FIG. 10 is a flow chart illustrating an exemplary process 1000 for performing a handover with reduced interference on MSIM wireless communication devices according to some aspects. As described below, some or all illustrated features may be omitted in a particular implementation within the scope of the present disclosure, and some illustrated features may not be required for implementation of all examples. In some examples, the process 1000 may be carried out by the UE 1100 illustrated in FIG. 11. In some examples, the process 1000 may be carried out by any suitable apparatus or means for carrying out the functions or algorithm described below.

At block 1002, the UE may connect to a first cell operating in a first frequency band of a first frequency range for a first SIM card (SIM1). The SIM1 may, for example, be a DDS SIM. The first frequency range may be associated with a first RAT. For example, the first frequency range may be FR1 associated with a NR RAT. At block 1004, the UE may further select a second cell of a set of cells operating on respective second frequency bands of a second frequency range for a second SIM card (SIM2). The SIM2 may, for example, be a n-DDS SIM. The second frequency range may be associated with a second RAT. For example, the second RAT may be LTE. Although the example described in FIG. 10 considers a NR DDS SIM and an LTE n-DDS SIM, the process described in FIG. 10 may be applicable to any other combination of interfering frequency bands. The UE may connect to the first cell in an RRC connected mode of SIM1 and may select the second cell in an RRC idle mode of SIM2.

At 1006, the UE may determine whether the second frequency band of the second cell interferes with the first frequency band of the first cell. For example, the UE may determine whether there is interference between the first frequency band and the second frequency band after performing a handover to the first cell or upon performing a cell selection or reselection to the second cell. Based on the ARFCN of the carrier frequency (e.g., a first ARFCN of a first carrier frequency) in the first frequency band in the first cell, the UE may identify a location of the second harmonic of the first carrier frequency. The UE may then determine whether a second ARFCN of a second carrier frequency in the second frequency band of the second cell interferes with the second harmonic of the first carrier frequency. If there is interference between the first frequency band in the first cell and the second frequency band in the second cell, the UE may experience desense on SIM2.

Therefore, in response to detecting interference between the first cell and the second cell (Y branch of block 1006), at block 1008, the UE may determine whether there are any cells in the set of cells operating on a respective second frequency band that avoids (or otherwise minimizes) interference with the first frequency band in the first cell. If there are one or more cells operating on respective second frequency bands that avoid interference with the first frequency band of the first cell (Y branch of block 1008), at block 1010, the UE may identify a cell subset of the set of cells that operate on the respective second frequency bands that minimize interference with the first frequency band of the first cell and reselect a third cell from the cell subset for SIM2. For example, the UE may perform a cell reselection procedure to reselect the third cell. In examples in which the first cell operates on an LTE frequency band (or another legacy RAT frequency band) and the second cell operates on a NR frequency band in FR1, the cell subset may include cells operating on frequency bands within FR1 and/or cells operating on frequency bands within a third frequency range (e.g., FR2 or higher). Thus, in this example, the UE may reselect to another FR1 cell or to an FR2 (or higher) cell for SIM2.

If there are no cells in the set of cells operating on second frequency bands in the second frequency range that avoid (or minimize) interference with the first frequency band of the first cell (N branch of block 1008), at block 1012, the UE may determine whether there are any cells operating in the first frequency range (e.g., cells operating on respective first frequency bands in the first frequency range) that avoid interference with the second frequency band of the second cell. If there are one or more cells operating on respective first frequency bands in the first frequency range that avoid interference with the second frequency band of the second cell (Y branch of block 1012), at block 1014, the UE may select a cell (e.g., a fourth cell) of the one or more cells operating on respective first frequency bands in the first frequency range that avoid interference with the second frequency band of the second cell and perform a handover from the first cell to the fourth cell. For example, the UE may identify another cell subset of another set of cells operating in the first frequency range that have operating first frequency bands that avoid interference with the second frequency band in the second cell and select the fourth cell from the other cell subset.

If there are no cells operating on first frequency bands in the first frequency range that avoid (or minimize) interference with the second frequency band of the second cell (N branch of block 1012), at block 1016, the UE may determine whether there are other cells in the geographical area operating on another frequency range (e.g., FR2 or higher) supported by SIM1. For example, the UE may determine whether the network has configured FR2 or higher measurement resources for FR2 cells in the geographical area. If there are cells operating on another frequency range (e.g., a third frequency range) that avoids interference with the second frequency range (Y branch of block 1016), at block 1018, the UE may select a cell (e.g., a fifth cell) operating in the third frequency range and perform a handover from the first cell to the fifth cell. For example, the UE may search and measure the FR2 cells in the area and then select an FR2 cell based on the cell measurements to perform a handover.

If there are no cells operating on a different frequency range in the geographical area (N branch of block 1016), at block 1020, the UE may mitigate desense in the SIM2 receiver. For example, the UE may reduce the uplink transmit power of uplink transmissions by SIM1 during the paging time window of SIM2.

Figure 11:
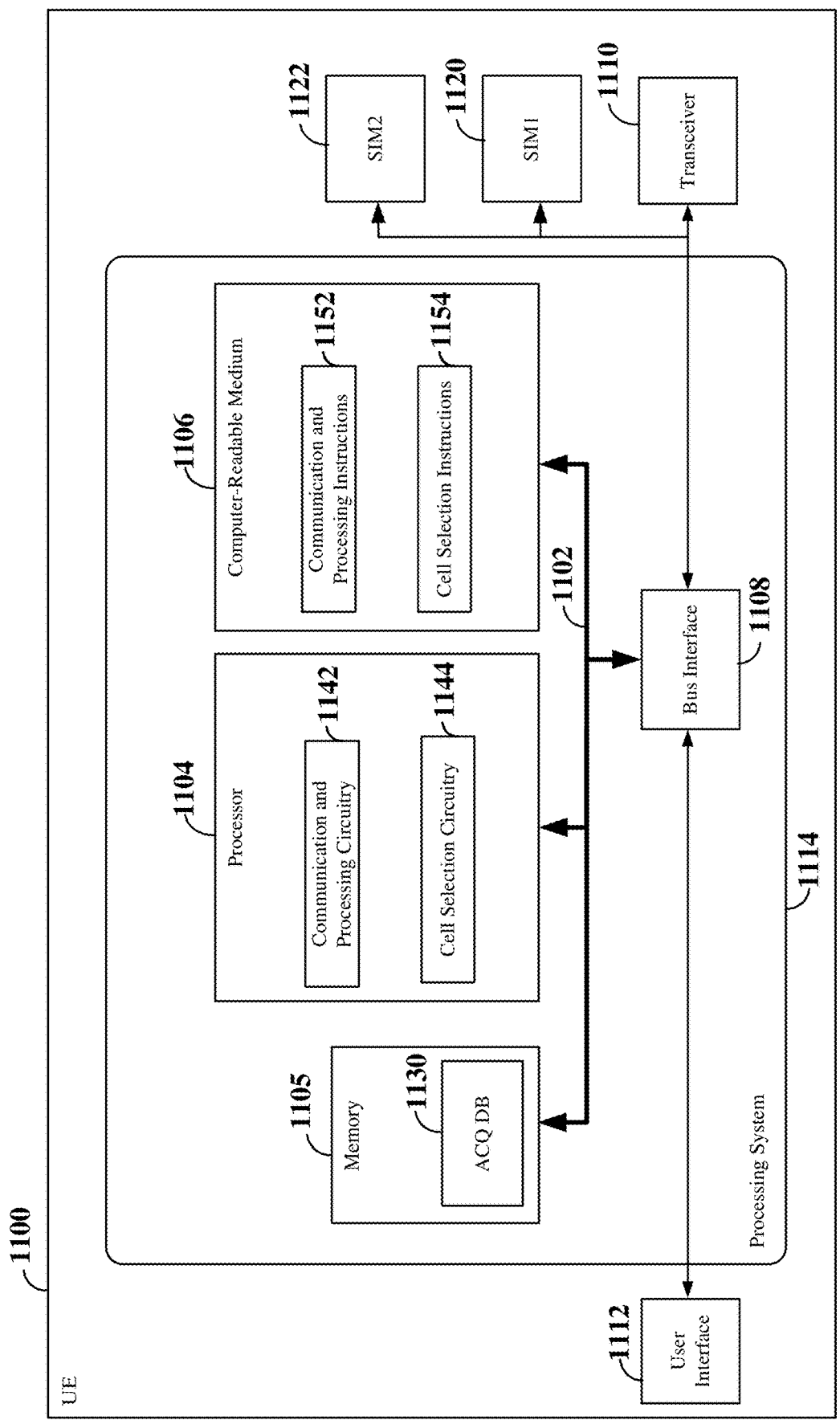
FIG. 11 is a block diagram conceptually illustrating an example of a hardware implementation for a scheduled entity according to some aspects.

FIG. 11 is a block diagram illustrating an example of a hardware implementation for a user equipment (UE) 1100 employing a processing system 1114. For example, the UE 1100 may be any of the UEs, wireless communication devices, or other scheduled entities illustrated in any one or more of FIGS. 1, 2 and/or 4-6.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described below and illustrated in FIGS. 7, 9, 10, and/or 12.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102, a transceiver 1110, and one or more subscriber identity module (SIM) cards 1120 and 1122. The transceiver 1110 provides a communication interface or a means for communicating with various other apparatus over a transmission medium (e.g., air interface). The SIM cards 1120 and 1122 may include, for example, a first SIM card (SIM1) 1120 and a second SIM card (SIM2) 1122. SIM1 may be associated with a DDS to provide data services, while SIM2 may be associated with a n-DDS to provide voice services. Depending upon the nature of the apparatus, a user interface 1112 (e.g., keypad, display, speaker, microphone, joystick) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store an acquisition database (ACQ DB) 1130 that may be used by the processor 1104 in cell acquisition. In some examples, the ACQ DB 1130 may include a list of one or more frequency bands (FBs) in a frequency range associated with one of the SIM cards 1120 or 1122. For example, the ACQ DB 1130 may include a list of FBs for use by the processor 1104 in selecting a cell for the n-DDS SIM2 1122. In some examples, multiple ACQ DBs 1130 may be included in the memory 1105, each associated with a different SIM card (or a different frequency range supported by a SIM card).

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with one or more base stations (e.g., gNB or eNB) and/or TRPs via Uu links. For example, the communication and processing circuitry 1142 may be configured to communicate with a first TRP (or base station) utilizing SIM1 1120 and a second TRP (or base station) utilizing SIM2 1122. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains.

In some implementations where the communication involves receiving information, the communication and processing circuitry 1142 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

In some examples, the communication and processing circuitry 1142 may be configured to communicate with a first cell utilizing SIM1 1120 and a second cell utilizing SIM2 1122. For example, the communication and processing circuitry 1142 may be configured to communicate with the first cell on an uplink and with the second cell on the downlink. In some examples, the uplink and downlink communication may occur simultaneously. For example, the communication and processing circuitry 1142 may be configured to generate and transmit uplink packets to the first cell during a paging time window on the second cell. In this example, the SIM2 1122 may interrupt receive operations (e.g., downlink operations) of the SIM1 1120 to receive and decode a page during the paging time window.

In some examples, the communication and processing circuitry 1142 may be configured to communicate with the first cell utilizing a first frequency band in a first frequency range and with the second cell utilizing a second frequency band in a second frequency range. For example, the first frequency range may be associated with a first RAT, such as NR, and the second frequency range may be associated with a second RAT, such as LTE. In other examples, the first frequency range and the second frequency range may be associated with the same RAT (e.g., NR or LTE). In this example, the first and second frequency ranges may be the same. In some examples, the communication and processing circuitry 1142 may be configured to communicate in one of multiple frequency ranges utilizing one of the SIM cards (e.g., SIM1 1120). For example, the communication and processing circuitry 1142 may be configured to communicate on FR1 or FR2 (or higher FR) utilizing SIM1 1120. The communication and processing circuitry 1142 may further be configured to execute communication and processing instructions (software) 1152 stored in the computer-readable medium 1106 to implement one or more of the functions described herein.

The processor 1104 may further include cell selection circuitry 1144, configured to select a first cell for communication utilizing SIM1 1120 and a second cell for communication utilizing SIM2 1122. In some examples, the first cell may operate in a first frequency band of a first frequency range and the second cell may operate in a second frequency band of a second frequency range. To select the second cell, the cell selection circuitry 1144 may further be configured to identify a set of cells operating in the second frequency range within a geographical area of the UE 1100. The cell selection circuitry 1144 may then be configured to identify a cell subset of the set of cells operating in respective second frequency bands of the second frequency range that each minimize (or avoid) interference with the first frequency band of the first cell. For example, the cell selection circuitry 1144 may identify a location of a second harmonic of a first carrier frequency of the first frequency band in the first cell. The UE may then identify the second frequency bands (e.g., second ARFCNs of second carrier frequencies) that do not interfere with (or otherwise result in a reduced interference with) the second harmonic of the first carrier frequency. The cell selection circuitry 1144 may then select the second cell from the cell subset.

In some examples, the cell selection circuitry 1144 may select the second cell from the cell subset during a cell acquisition search for SIM1 1120 and SIM2 1122. For example, the cell selection circuitry 1144 may camp onto the first cell operating in the first frequency band of the first frequency range for SIM1 1120 upon exiting from an out-of-service state. The cell selection circuitry 1144 may then access the ACQ DB 1130 stored in the memory 1105 that includes a first list of the set of cells in the second frequency range in a first order. The cell selection circuitry 1144 may then sort the acquisition database to include a second list of the set of cells in a second order. The second order may include the cell subset (e.g., the cell subset operating in respective second frequency bands that minimize or avoid interference with the first frequency band)

listed prior to a remainder of the set of cells in the second frequency range. The cell selection circuitry 1144 may then perform a cell acquisition search utilizing the second list in the acquisition database and camp onto the second cell based on the cell acquisition search.

In some examples, the cell selection circuitry 1144 may select the second cell from the cell subset while the SIM1 1120 (DDS SIM card) is in a connected mode. In this example, the cell selection circuitry 1144 may detect interference between the first cell and a third cell of the set of cells on which the UE 1100 is communicating for SIM2 1122. In some examples, the cell selection circuitry 1144 may detect the interference as a result of the cell selection circuitry 1144 performing a handover from a fourth cell in the first frequency range to the first cell in the first frequency range for SIM1 1120. In other examples, the cell selection circuitry 1144 may detect the interference as a result of the cell selection circuitry 1144 performing a reselection of the third cell for SIM2 1122 while the SIM1 1120 is communicating on the first cell. In response to detecting the interference between the first cell and the third cell, the cell selection circuitry 1144 may be configured to trigger a reselection from the third cell to the second cell.

In other examples, the SIM1 1120 may correspond to a n-DDS SIM card operating in an idle mode and the SIM2 1122 may correspond to a DDS SIM card operating in a connected mode. For example, the SIM1 1120 may operate on an LTE frequency range of an LTE RAT, while the SIM2 1122 may operate on FR1 of a NR RAT. In this example, the first cell may be an LTE cell and the first frequency range may be an LTE frequency range, while the set of cells may be NR cells and the second frequency range may be FR1. In examples in which there are no other LTE cells that do not interfere with the frequency band utilized by a current NR FR1 cell (e.g., a third cell of the set of cells), the cell selection circuitry 1144 may be configured to select the second cell (e.g., a NR FR1 cell) from the cell subset that operates on a respective second frequency band that reduces (or avoids) interference with the first frequency band of the first cell (e.g., the LTE cell) and perform a handover from the third cell to the selected second cell.

In other examples in which the NR SIM card (e.g., in this example, SIM2 1122) supports FR2 (or other higher FR) and the network has configured FR2 or higher measurement resources for FR2 or higher cells, the second frequency range associated with the set of cells may be FR2 or higher. In this example, the cell subset may include each of the set of cells since all cells in FR2 or a higher FR operate in frequency bands that avoid interference with LTE cells. The cell selection circuitry 1144 may then be configured to select the second cell (e.g., a NR FR2 or higher cell) from the set of cells and perform a handover from the third cell (e.g., a NR FR1 cell) to the selected second cell.

In some examples, the cell selection circuitry 1144 may further be configured to perform measurements on the cell subset in an idle mode of SIM2 1122 (e.g., in examples in which SIM2 1122 corresponds to the n-DDS SIM card). For example, the cell selection circuitry 1144 may be configured to limit the performance of idle mode cell search and measurement for SIM2 1122 to the non-interfering second frequency bands (e.g., the second frequency bands that do not interfere with the first frequency bands) to reduce the cell measurement and search complexity. The cell selection circuitry 1144 may further be configured to execute cell selection instructions (software) 1154 stored in the computer-readable medium 1106 to implement one or more of the functions described herein.

Figure 12:
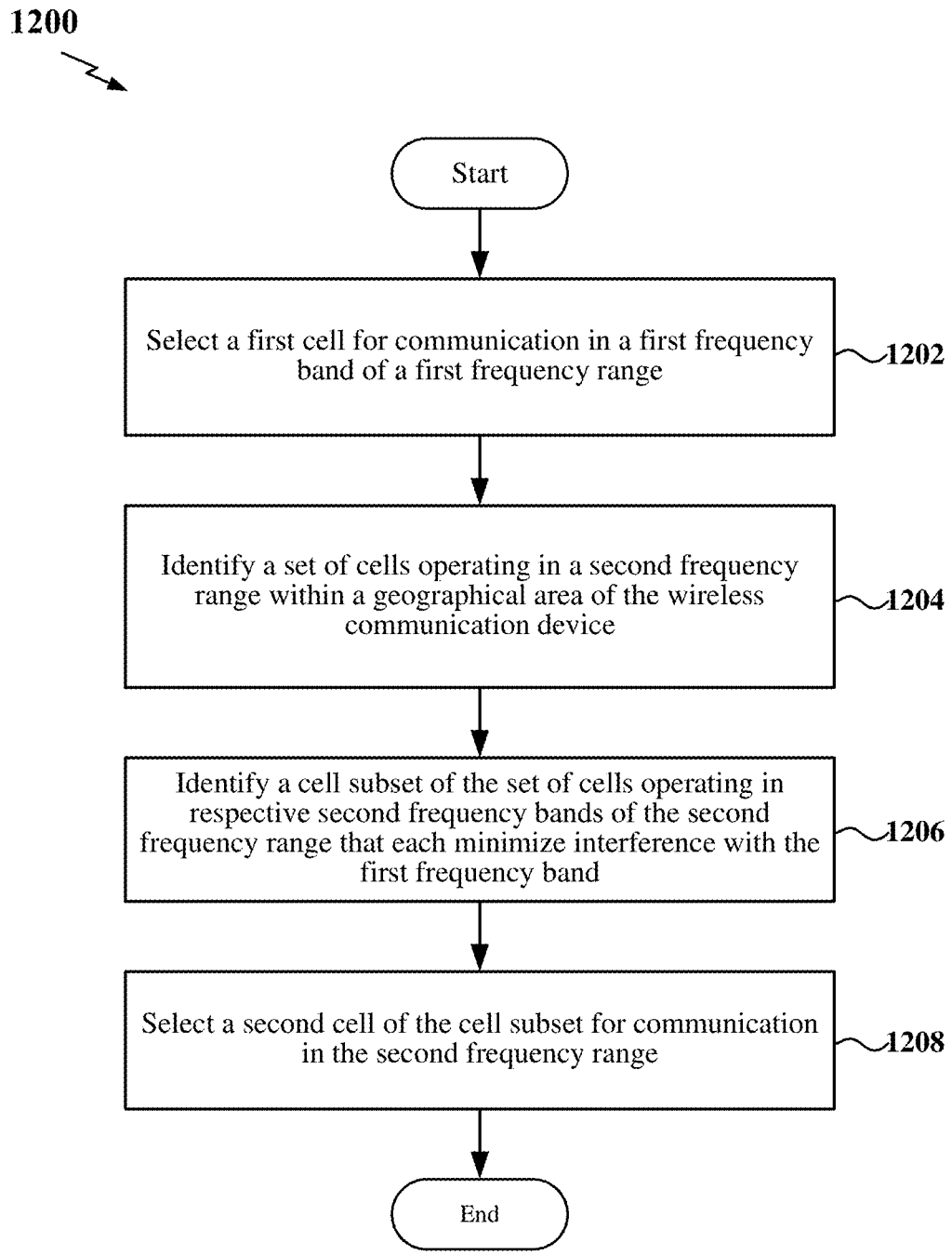
FIG. 12 is a flow chart illustrating an exemplary process for interference reduction in MSIM devices according to some aspects.

FIG. 12 is a flow chart illustrating an exemplary process 1200 for interference reduction in MSIM devices according to some aspects. As described below, some or all illustrated features may be omitted in a particular implementation within the scope of the present disclosure, and some illustrated features may not be required for implementation of all examples. In some examples, the process 1200 may be carried out by the UE 1100 illustrated in FIG. 11. In some examples, the process 1200 may be carried out by any suitable apparatus or means for carrying out the functions or algorithms described below.

At block 1202, a wireless communication device (e.g., UE 1100) may select a first cell for communication in a first frequency band of a first frequency range. For example, the cell selection circuitry 1144 shown and described above in connection with FIG. 11 may provide a means to select the first cell.

At block 1204, the wireless communication device may identify a set of cells operating in a second frequency range within a geographical area of the wireless communication device. In some examples, the first frequency range is associated with a first radio access technology and the second frequency range is associated with a second radio access technology. For example, the first RAT may be NR, while the second RAT may be LTE. In some examples, the first frequency range and the second frequency range are associated with a same radio access technology and the first frequency range is the same as the second frequency range. For example, the first and second frequency ranges may each correspond to a NR frequency range (e.g., FR1, FR2, etc.) or an LTE frequency range. For example, the cell selection circuitry 1144 shown and described above in connection with FIG. 11 may provide a means to identify the set of cells.

At block 1206, the wireless communication device may identify a cell subset of the set of cells operating in respective second frequency bands of the second frequency range that each minimize interference with the first frequency band. In some examples, the wireless communication device may access an acquisition database including a first list of the set of cells in a first order and sort the acquisition database to include a second list of the set of cells in a second order. The second order may include the cell subset listed prior to a remainder of the set of cells. For example, the cell selection circuitry 1144 shown and described above in connection with FIG. 11 may provide a means to identify the cell subset.

At block 1208, the wireless communication device may select a second cell of the cell subset for simultaneous communication in the second frequency band via the second cell and the first frequency band via the first cell. For example, the wireless communication device may communicate with the first cell using a first subscriber identity module (SIM) card of the wireless communication device and may communicate with the second cell utilizing a second SIM card of the wireless communication device. In some examples, the wireless communication device may communicate on an uplink in the first cell and on a downlink in the second cell. In some examples, the wireless communication device may further perform measurements on the cell subset in an idle mode associated with the second SIM card.

In some examples, the wireless communication device may select the second cell by performing a cell acquisition search utilizing the second list in the acquisition database and camping onto the second cell based on the cell acquisition search.

In some examples, the wireless communication device may select the second cell by detecting interference between the first cell and a third cell on which the wireless communication device is communicating and triggering a reselection from the third cell to the second cell in response to detecting the interference. For example, the wireless communication device may detect the interference in response to performing a handover from a fourth cell in the first frequency range to the first cell. In this example, the wireless communication device may communicate on the fourth cell in the first frequency range and the third cell in the second frequency range. The wireless communication device may then perform the handover from the fourth cell to the third cell, and detect the interference between the first cell and the third cell in response to performing the handover. As another example, the wireless communication may detect the interference between the first cell and the third cell in response to performing an initial reselection to the third cell while communicating on the first cell. In some examples, the cell subset includes each of the set of cells and the second frequency range avoids interference with the first frequency range. In this example, the third cell may operate on a third frequency band in a third frequency range that interferes with the first frequency range and is lower than the second frequency range. For example, the third frequency range may be FR1 and the second frequency range may be FR2.

In some examples, the wireless communication device may select the second cell by performing a handover from a third cell of the set of cells to the second cell in the cell subset. In some examples, the cell subset includes each of the set of cells and the second frequency range avoids interference with the first frequency range. In this example, the wireless communication device may communicate on a third cell operating on a third frequency band of a third frequency range that interferes with the first frequency band and perform a handover from the third cell to the second cell. For example, the second frequency range may include FR2 and the third frequency range may include FR1. For example, the cell selection circuitry 1144, together with the communication and processing circuitry 1142, shown and described above in connection with FIG. 11 may provide a means to select the second cell.

In one configuration, an apparatus (e.g., UE 1100) configured for wireless communication includes means for performing the processes, procedures, and methods described in relation to FIGS. 7, 9, 10, and 12. For example, the apparatus may include means for selecting a first cell for communication in a first frequency band of a first frequency range, means for identifying a set of cells operating in a second frequency range within a geographical area of the wireless communication device, means for identifying a cell subset of the set of cells operating in respective second frequency bands of the second frequency range that each minimize interference with the first frequency band, and means for selecting a second cell of the cell subset for simultaneous communication in the second frequency band via the second cell and the first frequency band via the first cell. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, and/or 4-6, and utilizing, for example, the processes and/or algorithms described herein in relation to FIGS. 7, 9, 10, and/or 12.

The following provides an overview of examples of the present disclosure.

Example 1: A method of wireless communication at a wireless communication device in a wireless communication network, comprising: selecting a first cell for communication in a first frequency band of a first frequency range; identifying a set of cells operating in a second frequency range within a geographical area of the wireless communication device; identifying a cell subset of the set of cells operating in respective second frequency bands of the second frequency range that each minimize interference with the first frequency band; and selecting a second cell of the cell subset for simultaneous communication in the respective second frequency band via the second cell and the first frequency band via the first cell.

Example 2: The method of example 1, further comprising: communicating with the first cell utilizing a first subscriber identify module (SIM) card of the wireless communication device; and communicating with the second cell utilizing a second SIM card of the wireless communication device.

Example 3: The method of example 2, wherein the communicating with the first cell comprises communicating on an uplink in the first cell, and wherein the communicating with the second cell comprises communicating on a downlink in the second cell.

Example 4: The method of example 2 or 3, further comprising: performing measurements on the cell subset in an idle mode associated with the second SIM card.

Example 5: The method of any of examples 1 through 4, wherein the identifying the cell subset further comprises: accessing an acquisition database comprising a first list of the set of cells in a first order; and sorting the acquisition database to comprise a second list of the set of cells in a second order, wherein the second order comprises the cell subset listed prior to a remainder of the set of cells.

Example 6: The method of example 5, wherein the selecting the second cell further comprises: performing a cell acquisition search utilizing the second list in the acquisition database; and camping onto the second cell based on the cell acquisition search.

Example 7: The method of any of examples 1 through 4, wherein the selecting the second cell further comprises: detecting interference between the first cell and a third cell on which the wireless communication device is communicating; and triggering a reselection from the third cell to the second cell in response to the detecting the interference.

Example 8: The method of example 7, wherein the detecting the interference between the first cell and the third cell comprises: communicating on a fourth cell in the first frequency range and the third cell in the second frequency range; performing a handover from the fourth cell to the first cell; and detecting the interference between the first cell and the third cell in response to the performing the handover.

Example 9: The method of example 7, wherein the detecting the interference between the first cell and the third cell comprises: performing an initial reselection to the third cell while communicating on the first cell; and detecting the interference between the first cell and the third cell in response to the performing the initial reselection.

Example 10: The method of any of examples 7 through 9, wherein the cell subset comprises each of the set of cells and the second frequency range avoids interference with the first frequency range, and wherein the third cell operates on a third frequency band in a third frequency range that interferes with the first frequency range and is lower than the second frequency range.

Example 11: The method of any of examples 1 through 4, wherein the selecting the second cell further comprises: performing a handover from a third cell in the set of cells to the second cell in the cell subset.

Example 12: The method of any of examples 1 through 4, wherein the cell subset comprises each of the set of cells and the second frequency range avoids interference with the first frequency range, and wherein the selecting the second cell further comprises: communicating on a third cell operating on a third frequency band of a third frequency range, wherein the third frequency band interferes with the first frequency band; and performing a handover from the third cell to the second cell.

Example 13: The method of example 12, wherein the second frequency range comprises FR2 and the third frequency range comprises FR1.

Example 14: The method of any of examples 1 through 13, wherein the first frequency range is associated with a first radio access technology and the second frequency range is associated with a second radio access technology.

Example 15: The method of any of examples 1 through 13, wherein the first frequency range and the second frequency range are associated with a same radio access technology and the first frequency range is the same as the second frequency range.

Example 16: A user equipment (UE) in a wireless communication network comprising a transceiver, a memory, and a processor coupled to the transceiver and the memory, the processor and the memory configured to perform a method of any one of examples 1 through 15.

Example 17: An apparatus configured for wireless communication comprising means for performing a method of any one of examples 1 through 15.

Example 18: A non-transitory computer-readable medium having stored therein instructions executable by one or more processors of a wireless communication device in a wireless communication network to perform a method of any one of examples 1 through 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-6, and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) in a wireless communication network, comprising:
a transceiver;
a memory; and
a processor coupled to the transceiver and the memory, wherein the processor and the memory are configured to:
select a first cell for communication in a first frequency band of a first frequency range;
identify a set of cells operating in a second frequency range within a geographical area of the UE;
identify a cell subset of the set of cells operating in respective second frequency bands of the second frequency range that each minimize interference with the first frequency band; and
select a second cell of the cell subset for simultaneous communication in the respective second frequency band via the second cell and the first frequency band via the first cell.

2. The UE of claim 1, wherein the processor and the memory are further configured to:
communicate with the first cell utilizing a first subscriber identify module (SIM) card of the UE via the transceiver; and
communicate with the second cell utilizing a second SIM card of the UE via the transceiver.

3. The UE of claim 2, wherein the processor and the memory are further configured to communicate on an uplink in the first cell and to communicate with the second cell comprises communicating on a downlink in the second cell.

4. The UE of claim 2, wherein the processor and the memory are further configured to:
perform measurements on the cell subset in an idle mode associated with the second SIM card.

5. The UE of claim 1, wherein the processor and the memory are further configured to:
access an acquisition database comprising a first list of the set of cells in a first order; and
sort the acquisition database to comprise a second list of the set of cells in a second order, wherein the second order comprises the cell subset listed prior to a remainder of the set of cells.

6. The UE of claim 5, wherein the processor and the memory are further configured to:
perform a cell acquisition search utilizing the second list in the acquisition database; and
camp onto the second cell based on the cell acquisition search.

7. The UE of claim 1, wherein the processor and the memory are further configured to:
detect interference between the first cell and a third cell on which the UE is communicating; and
trigger a reselection from the third cell to the second cell in response to the detecting the interference.

8. The UE of claim 7, wherein the processor and the memory are further configured to:
communicate on a fourth cell in the first frequency range and the third cell in the second frequency range;
perform a handover from the fourth cell to the first cell; and
detect the interference between the first cell and the third cell in response to the performing the handover.

9. The UE of claim 7, wherein the processor and the memory are further configured to:
perform an initial reselection to the third cell while communicating on the first cell; and
detect the interference between the first cell and the third cell in response to the performing the initial reselection.

10. The UE of claim 7, wherein the cell subset comprises each of the set of cells and the second frequency range avoids interference with the first frequency range, and wherein the third cell operates on a third frequency band in a third frequency range that interferes with the first frequency range and is lower than the second frequency range.

11. The UE of claim 1, wherein the processor and the memory are further configured to:
perform a handover from a third cell in the set of cells to the second cell in the cell subset.

12. The UE of claim 1, wherein the cell subset comprises each of the set of cells and the second frequency range avoids interference with the first frequency range, and wherein the processor and the memory are further configured to:
communicate on a third cell operating on a third frequency band of a third frequency range, wherein the third frequency band interferes with the first frequency band; and
perform a handover from the third cell to the second cell.

13. The UE of claim 12, wherein the second frequency range comprises FR2 and the third frequency range comprises FR1.

14. The UE of claim 1, wherein the first frequency range is associated with a first radio access technology and the second frequency range is associated with a second radio access technology.

15. The UE of claim 1, wherein the first frequency range and the second frequency range are associated with a same radio access technology and the first frequency range is the same as the second frequency range.

16. A method of wireless communication at a wireless communication device in a wireless communication network, comprising:
selecting a first cell for communication in a first frequency band of a first frequency range;
identifying a set of cells operating in a second frequency range within a geographical area of the wireless communication device;
identifying a cell subset of the set of cells operating in respective second frequency bands of the second frequency range that each minimize interference with the first frequency band; and
selecting a second cell of the cell subset for simultaneous communication in the respective second frequency band via the second cell and the first frequency band via the first cell.

17. The method of claim 16, further comprising:
communicating with the first cell utilizing a first subscriber identify module (SIM) card of the wireless communication device; and
communicating with the second cell utilizing a second SIM card of the wireless communication device.

18. The method of claim 17, wherein the communicating with the first cell comprises communicating on an uplink in the first cell, and wherein the communicating with the second cell comprises communicating on a downlink in the second cell.

19. The method of claim 17, further comprising:
performing measurements on the cell subset in an idle mode associated with the second SIM card.

20. The method of claim 16, wherein the identifying the cell subset further comprises:
- accessing an acquisition database comprising a first list of the set of cells in a first order; and
- sorting the acquisition database to comprise a second list of the set of cells in a second order, wherein the second order comprises the cell subset listed prior to a remainder of the set of cells.

21. The method of claim 20, wherein the selecting the second cell further comprises:
- performing a cell acquisition search utilizing the second list in the acquisition database; and
- camping onto the second cell based on the cell acquisition search.

22. The method of claim 16, wherein the selecting the second cell further comprises:
- detecting interference between the first cell and a third cell on which the wireless communication device is communicating; and
- triggering a reselection from the third cell to the second cell in response to the detecting the interference.

23. The method of claim 22, wherein the cell subset comprises each of the set of cells and the second frequency range avoids interference with the first frequency range, and wherein the third cell operates on a third frequency band in a third frequency range that interferes with the first frequency range and is lower than the second frequency range.

24. The method of claim 16, wherein the selecting the second cell further comprises:
- performing a handover from a third cell in the set of cells to the second cell in the cell subset.

25. The method of claim 16, wherein the cell subset comprises each of the set of cells and the second frequency range avoids interference with the first frequency range, and wherein the selecting the second cell further comprises:
- communicating on a third cell operating on a third frequency band of a third frequency range, wherein the third frequency band interferes with the first frequency band; and
- performing a handover from the third cell to the second cell.

26. An apparatus configured for wireless communication, comprising:
- means for selecting a first cell for communication in a first frequency band of a first frequency range;
- means for identifying a set of cells operating in a second frequency range within a geographical area of the apparatus;
- means for identifying a cell subset of the set of cells operating in respective second frequency bands of the second frequency range that each minimize interference with the first frequency band; and
- means for selecting a second cell of the cell subset for simultaneous communication in the respective second frequency band via the second cell and the first frequency band via the first cell.

27. The apparatus of claim 26, wherein the means for identifying the cell subset further comprises:
- means for accessing an acquisition database comprising a first list of the set of cells in a first order; and
- means for sorting the acquisition database to comprise a second list of the set of cells in a second order, wherein the second order comprises the cell subset listed prior to a remainder of the set of cells, and wherein the means for selecting the second cell further comprises:
  - means for performing a cell acquisition search utilizing the second list in the acquisition database; and
  - means for camping onto the second cell based on the cell acquisition search.

28. The apparatus of claim 26, wherein the means for selecting the second cell further comprises:
- means for detecting interference between the first cell and a third cell on which the apparatus is communicating; and
- means for triggering a reselection from the third cell to the second cell in response to the detecting the interference.

29. The apparatus of claim 26, wherein the means for selecting the second cell further comprises:
- means for performing a handover from a third cell in the set of cells to the second cell in the cell subset.

30. A non-transitory computer-readable medium having instructions stored therein for causing one or more processors of a wireless communication device in a wireless communication network to:
- select a first cell for communication in a first frequency band of a first frequency range;
- identify a set of cells operating in a second frequency range within a geographical area of the UE;
- identify a cell subset of the set of cells operating in respective second frequency bands of the second frequency range that each minimize interference with the first frequency band; and
- select a second cell of the cell subset for simultaneous communication in the respective second frequency band via the second cell and the first frequency band via the first cell.

* * * * *